United States Patent Office 3,482,244
Patented Dec. 2, 1969

3,482,244
ELECTRONIC SCANNING ANTENNA SYSTEMS
Philippe Gadenne, Paris, France, assignor to CSF Compagnie Generale de Telegraphie Sans Fil, a corporation of France
Filed Dec. 12, 1966, Ser. No. 602,450
Claims priority, application France, Dec. 13, 1965, 42,026
Int. Cl. H04b 7/02
U.S. Cl. 343—100                3 Claims

ABSTRACT OF THE DISCLOSURE

In order to overcome the drawbacks due to the quantization of the phase shifters associated to electronic scanning antennae, the pointing angle error resulting from the quantization is calculated and the exact pointing direction is computed as the algebric sum of the desired pointed angle and the calculated angle error.

---

The present invention relates to electronic scanning antennae used, in particular, in monopulse radar systems, of the type comprising a plurality of radiating elements and wherein the scanning of the beam is obtained by phase shifting the various radiating elements with respect to each other.

In order to point the beam in a desired direction, it is known to provide at each element a phase shift, the value of which is selected amongst a plurality of quantization levels. Generally, such a quantization introduces an error in the phase of each element, since the value of the phase shift desired at each element is generally not exactly equal to one of the quantization levels. If such an antenna is used in a monopulse radar for obtaining a given information (elevation or bearing) about a target, the antenna is divided into two equal parts and one makes, among others, the difference between the signals received from the target by the two parts of the antenna. If the target is in the axis of the beam of the antenna, this difference is zero. In the case of an antenna of the kind described above, owing to the phase error of each element caused by the quantization, the actual axis of the beam of the antenna is directed in a direction which is not exactly coincident with the desired theoretical direction, so that an error occurs in the positioning of the target. This error is undesirable and is an increasing function of each of the phase errors relative to the radiating elements. Thus, this error in the direction of the target will be the larger, the larger is the step of the quantization.

In order to overcome this drawback, it is an object of the invention to calculate the error in the pointing of the beam, due to the quantization, so as to obtain the real pointing angle of the beam of the antenna.

According to the invention, there is provided an electronic scanning antenna system comprising: a plurality of radiating elements; a like plurality of controlled phase shifting means respectively associated with said radiating elements for applying thereto phase shifts having respective quantized values, said phase shifting means having respective control inputs; phase computing means for determining said quantized values for desired elevation and bearing values of the axis of the beam of said antenna, said computing means having a plurality of outputs respectively connected to said control inputs and a plurality of error outputs for providing the round-off errors occurring at each of said radiating elements; further computing means connected to said error outputs for computing the elevation and bearing pointing errors; and adding means for adding said elevation and bearing errors respectively to said desired elevation and bearing values to provide the real elevation and bearing values of said axis of the beam.

For a better understanding of the invention and to show how the same may be carried into effect, reference will be made to the drawings accompanying the following description and in which:

FIG. 1 shows diagrammatically an electronic scanning antenna comprising a plurality of radiating elements distributed on a surface A; this antenna has two axes of symmetry OX and OY which divide it into four equal parts. Only a single element $S_{m,n}$ is shown in the drawing ($m$ being an integer varying between $-p$ and $+p$ and $n$ being an integer varying between $-q$ and $+q$).

Figures 1, 2:
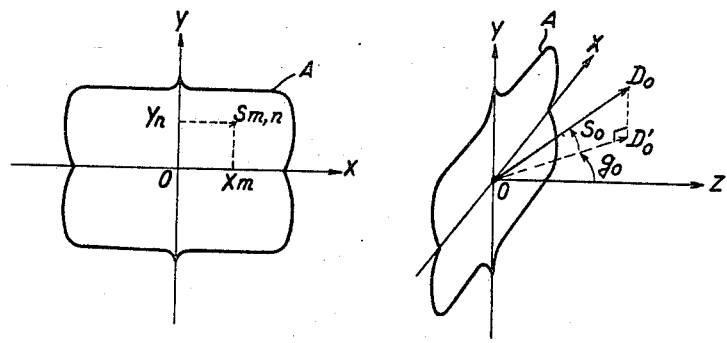
FIG. 1 shows diagrammatically an electronic scanning antenna.
FIG. 2 shows the manner in which a direction $D_0$ is defined.

The position of a radiating element $S_{m,n}$ is defined by its coordinates $X_m$ and $Y_n$. The origin of the phases for the various radiating elements is chosen at O. A direction $D_0$ is defined relative to the antenna, as shown in FIG. 2, by the angle $g_0$ (bearing) between the axis OZ, perpendicular to OX and OY, and the projection $D'_0$ of $D_0$ on the plane XOZ and the angle $s_0$ (elevation) between $D'_0$ and $D_0$.

It may be shown that the exact theoretical phase to be applied to each element $S_{m,n}$ in order to cause the axis of the beam of the antenna to coincide with a direction $D_0$, is as follows:

$$\Phi_{mno} = \frac{2\pi}{\lambda}[X_m \cos s_0 \sin g_0 + Y_n \sin s_0]$$

where $\lambda$ is the operating wavelength.

In fact, the phase to be applied to each element $S_{m,n}$ is selected amongst quantization levels. The direction of the round-off error occurring for each element is characterized, for a source $S_{m,n}$, by $\epsilon_{mn} = \pm 1$, according to whether the value of the phase is rounded off towards a quantization level higher or lower than the theoretical phase value. If $\Phi$ is the value of one quantization step, the value of the quantized phase selected for an element $S_{m,n}$ is as follows:

$$\Phi'_{mno} = \delta_{mn}\Phi$$

with $$\delta_{mn} = k_{mn} \text{ if } \epsilon_{mn} = -1$$

or $$\delta_{mn} = k_{mn} + 1 \text{ if } \epsilon_{mn} = +1$$

where $k_{mn}$ is a whole number defined by $$\frac{\Phi_{mno}}{\Phi} = k_{mn} + \gamma_{mn} \text{ with } 0 \leq \gamma_{mn} < 1$$

The round-off error for the element $S_{m,n}$ is therefore:

$$\Delta\Phi_{mno} = \Phi_{mno} - k_{mn}\Phi \text{ if } \epsilon_{mn} = -1$$

or $$\Delta\Phi_{mno} = \Phi_{mno} - (k_{mn}+1)\Phi \text{ if } \epsilon_{mn} = +1$$

If the values of $\epsilon_{mn}$ are symmetrical or antisymmetrical relative to the axes OX and OY, the angular errors in elevation and bearing of the direction of the axis of the beam of the antenna, relative to $D_0$, are given by the relations:

$$\Delta g_0 \simeq \frac{\lambda}{2\pi \cos s_0 \cos g_0} \frac{\sum_{m=1}^{p}\sum_{n=-q}^{q} B_{mn}\Delta\Phi_{mno}}{\sum_{m=1}^{p}\sum_{n=-q}^{q} B_{mn}X_m}$$

$$\Delta g_0 \simeq \frac{\lambda}{2\pi \cos s_0} \frac{\sum_{m=-p}^{p}\sum_{n=1}^{q} C_{mn}\Delta\Phi_{mno}}{\sum_{m=-p}^{p}\sum_{n=1}^{q} C_{mn}Y_n}$$

$B_{mn}$ and $C_{mn}$ are defined as follows:

For producing a given radiation diagram of the antenna, the illumination of the elements positioned along a row parallel to OX must vary according to a law defining, for each element, an illumination coefficient $B_{mn}$. Similarly, the illumination of the elements positioned along a column parallel to OY must vary according to a law defining for each element an illumination coefficient $C_{mn}$, the resultant illumination coefficient for a element $S_{m,n}$ being equal to the product $B_{mn} \cdot C_{mn}$.

Figure 3:
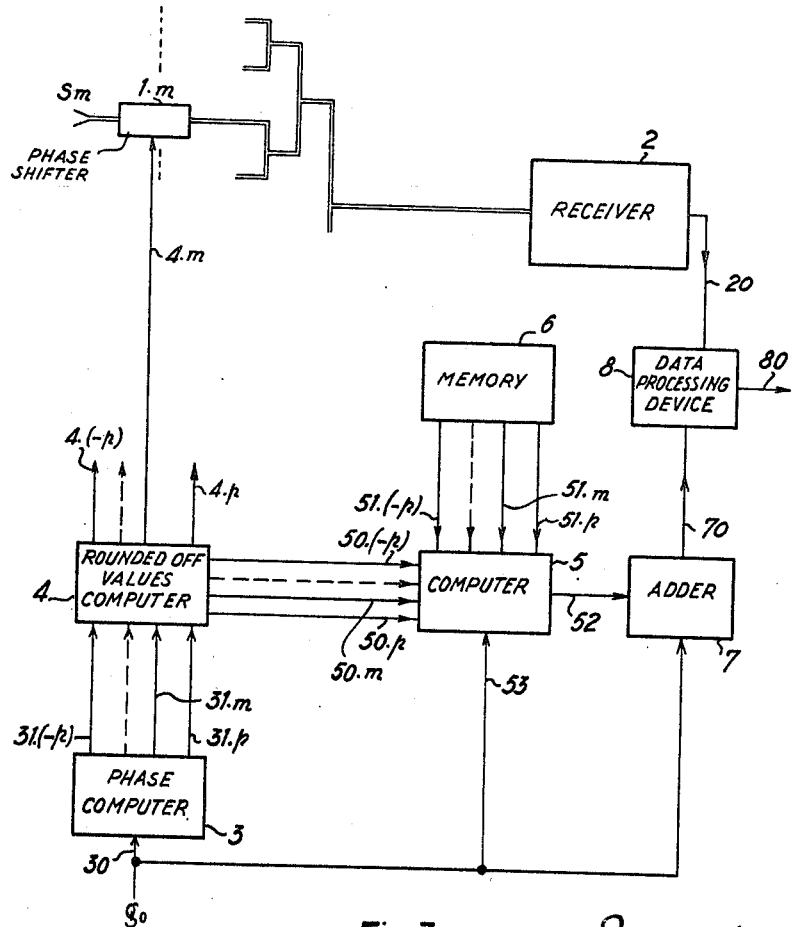
FIG. 3 shows an embodiment of an electronic scanning antenna system according to the invention.

FIG. 3 shows an embodiment of an electronic scanning antenna according to the invention. For the sake of simplicity, it will be assumed that the antenna comprises a linear arrangement of $2p$ elements located in a horizontal plane and providing a scanning in this plane.

The system according to the invention comprises $2p$ elements $S_m$ to which phase shifts are applied, respectively, by phase shifters 1.$m$ Each element $S_m$ is connected, for example, to a receiver 2 through the phase shifter 1.$m$ The value of the phase shift introduced by each phase shifter 1.$m$ is controlled, through connections 31.$m$ and 4.$m$, by a phase computer 3 and a rounded-off-value computing device 4, connected in series. The computer 3, which computes the theoretical phase shifts, has an input 30 connected to a first input of an adder 7. The computing device 4, which computes the quantized phase shifts is connected to the inputs 50.$m$ of a further computer 5, whose inputs 51.$m$ are connected to a memory 6. The input 53 of the computer 5 is connected to the input 30 of the computer 3. The output 52 of the computer 5 is connected to a second input of the adder 7, the output 70 of which is connected to a data processing device 8, having an output 80. This device 8 is connected to the receiver 2 by a connection 20.

The operation is as follows:

Since the direction $D_0$ is in the horizontal plane, only the Relation 1 is used and becomes:

$$\Delta g_0 \simeq \frac{\lambda}{2\pi \cos g_0} \frac{\sum_{m=1}^{p} B_m\Delta\Phi_{mo}}{\sum_{m=1}^{p} B_m X_m} \qquad (3)$$

The phase computer 3 receives at its input 30 the value of the desired angle $g_0$, required for pointing the axis of the beam of the antenna in the direction $D_0$. The operating wavelength $\lambda$ being known, the computer 3 transmits to the rounded-off-value computing device 4 the exact values of the phase shifts $\Phi_{mo}$ required for each source $S_m$. The rounded-off-value computing device 4 rounds off the values of the phase shifts $\Phi_{mo}$ to the quantized values $\Phi'_{mo}$ with a direction of error for each phase shift selected according to a predetermined law, the rounding off being always to the nearest value or following a code, for example. The computing device 4 controls therefore the corresponding phase shifters 1.$m$ and calculates at the same time the values $\Delta\Phi_{mo}$ of the errors which are caused by the quantization. It transmits these errors to a further computer 5, which has been supplied with the value $\lambda$, receives the value of $g_0$ at its input 53 and stores in its memory the values of $X_m$. The computer 5 thus calculates the value of the bearing error $\Delta g_0$, due to the quantization, by using the values of the illumination coefficients $B_m$, supplied to it by the memory 6 in which these values are stored. The value of the error $\Delta g_0$ is supplied to the adder 7 which receives also the theoretically desired value $g_0$. The adder 7 gives at its output 70 the value of the real pointing angle $g_{ro}=g_0+\Delta g_0$ of the axis of the beam of the antenna. This value $g_{ro}$ is supplied to the data processing device 8 which also receives the data supplied by the receiver 2. The desired information items are available at the output 80.

The improvements hereinbefore described make it possible to increase substantially the precision of radar. Naturally, the invention is not restricted to the embodiment just described and may, more particularly, provide equivalent arrangements for antennae, with pointing errors of the beam both in elevation and bearing.

What is claimed is:

1. An electronic scanning antenna system comprising: a plurality of radiating elements; a like plurality of controlled phase shifting means respectively associated with said radiating elements for applying thereto phase shifts having respective quantized values, said phase shifting means having respective control inputs; phase computing means for determining said quantized values for desired elevation and bearing values of the axis of the beam of said antenna, said computing means having a plurality of outputs respectively connected to said control inputs and a plurality of error outputs for providing the round-off errors occurring at each of said radiating elements; further computing means connected to said error outputs for computing the elevation and bearing pointing errors; and adding means for adding said elevation and bearing errors respectively to said desired elevation and bearing values to provide the real elevation and bearing values of said axis of the beam.

2. An electronic scanning antenna system as claimed in claim 1, wherein said further computing means comprise: a memory for storing the illumination coefficients of each of said radiating elements and a computer connected to said memory and having inputs respectively connected to said error outputs, further inputs for respectively receiving said desired elevation and bearing values and outputs for providing respectively said elevation and bearing errors.

3. An electronic scanning antenna system as claimed in claim 2, wherein said phase computing means comprise a phase computer having inputs for respectively receiving said desired elevation and bearing values and outputs for providing the exact phase shifts to be applied to each of said radiating elements and a rounded-off-value computing device, connected to said last mentioned outputs, for providing said quantized values by respectively rounding off said exact phase shifts according to a predetermined law, and having said plurality of error outputs.

References Cited

UNITED STATES PATENTS 3,387,301    6/1968    Blass et al. _____ 343—100.6

RODNEY D. BENNETT, Jr., Primary Examiner

T. H. TUBBESING, Assistant Examiner

U.S. Cl. X.R.

343—854